United States Patent Office 3,032,193
Patented May 1, 1962

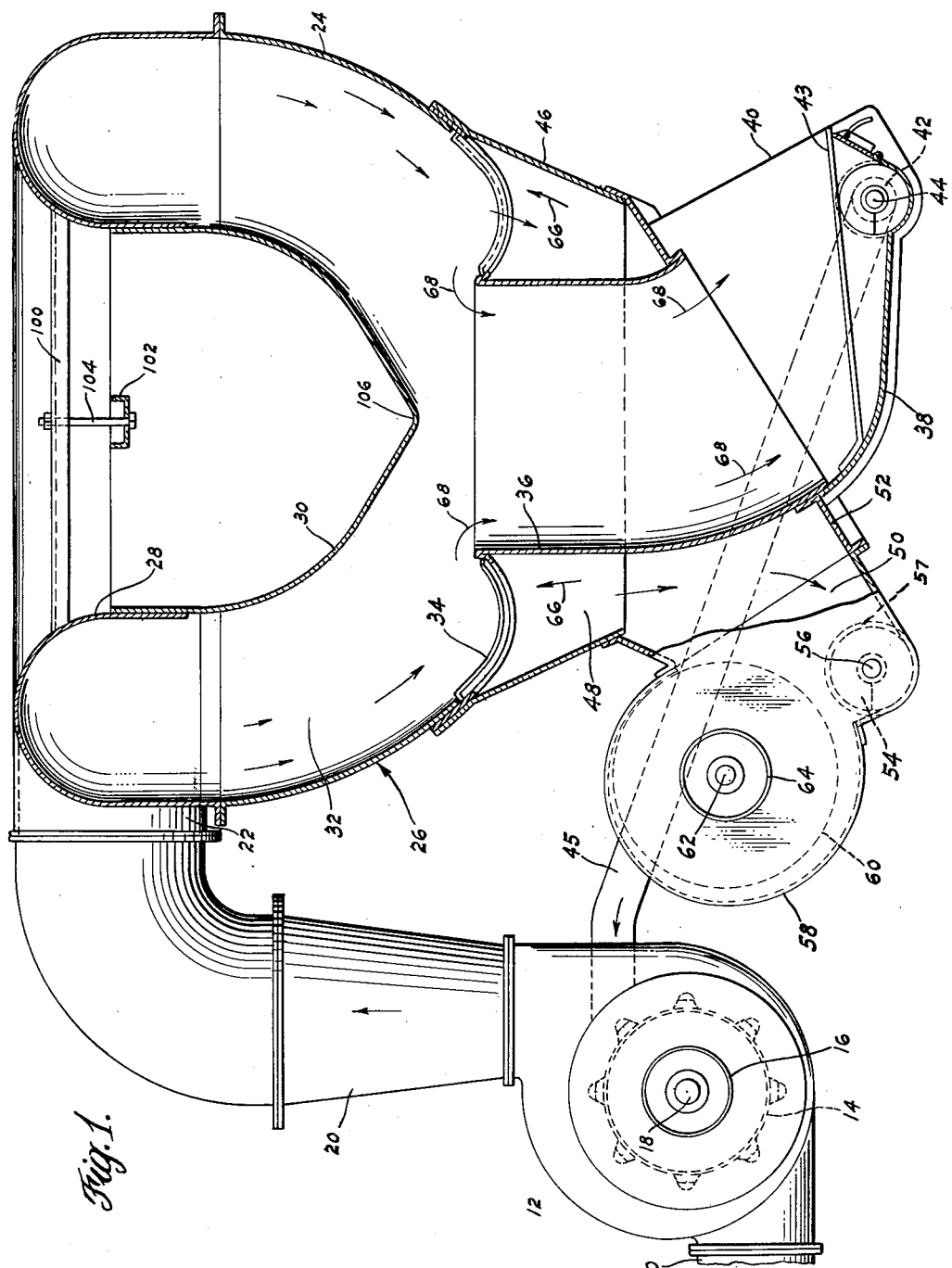

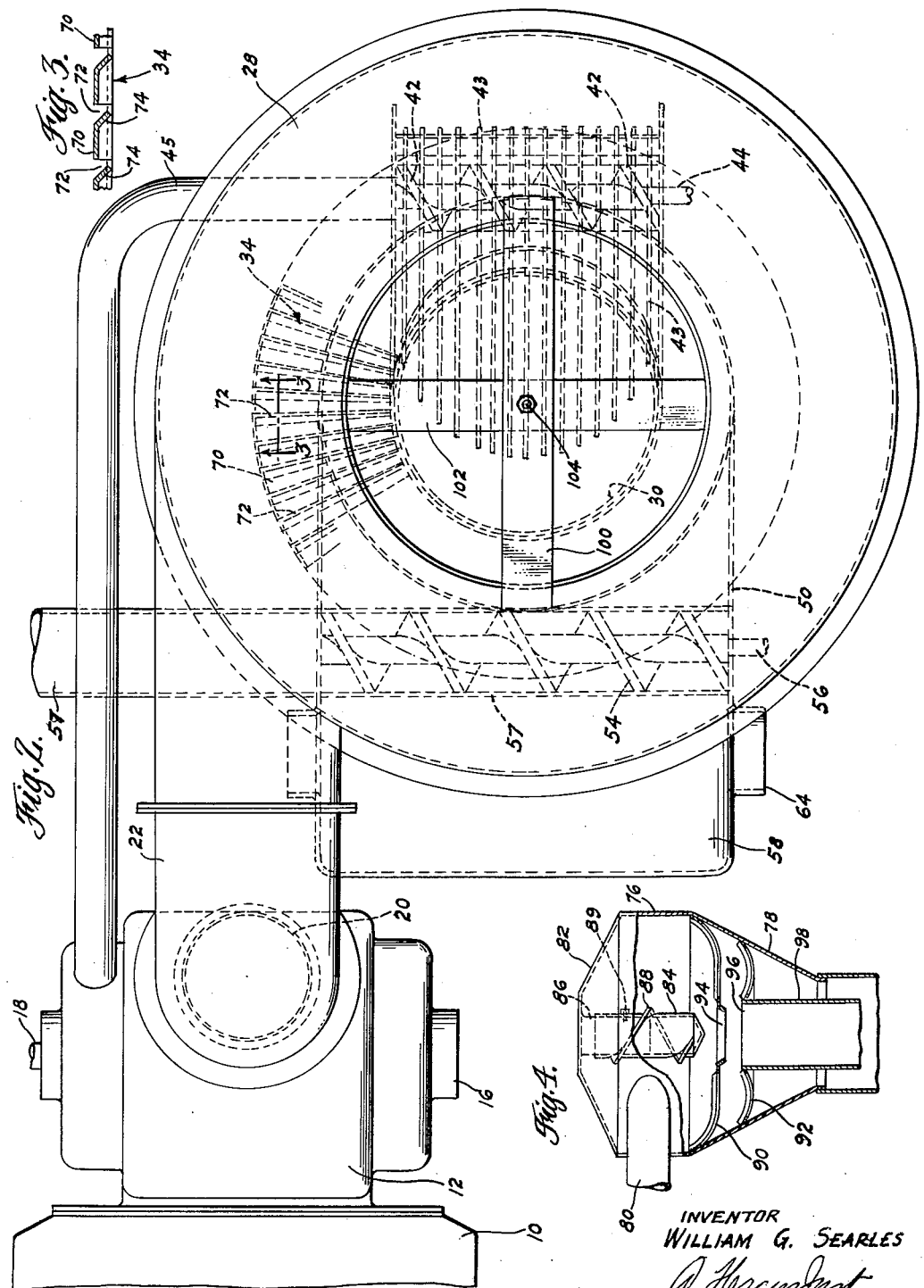

3,032,193
SEPARATOR
William G. Searles, Terre Hill, Pa., assignor to Sperry Rand Corporation, New Holland, Pa., a corporation of Delaware
Filed May 4, 1959, Ser. No. 810,901
14 Claims. (Cl. 209—144)

This invention relates to improvements in a cyclone separator and a method of effecting separation and, more particularly, to a cyclone separator for use in and a method of separating desired from undesired threshing products such as the heavier grain material from the more buoyant straw, chaff, weeds and other material of this type usually found in threshing products. Although the separator and method are highly suited for the separation of heavier grain material from the lighter and more buoyant threshing products such as straw, chaff and the like, it is to be understood that the use of the separator and such method are not to be restricted solely to such agricultural material as grain products inasmuch as the separator may be used to separate heavier from lighter and more buoyant materials which are intermixed and separation thereof is required. Such separation readily may be effected by said separator, particularly if the more buoyant products are of a buoyant, flocculent nature. Even different products of substantially the same specific gravity, for example, but of different shape or different resistances to air may be separated by such means.

A cyclone separator of the type embodying the present invention and such method of separation are readily adapted for use on ambulatory agricultural combines but it is to be understood further that the use of such separator is not to be restricted to use with combines since the same readily is adapted to be used with stationary threshing machines and the like.

Cyclone separators of many types and separation methods have been devised heretofore, some of these specifically being designed for separating threshing products such as the grain from the straw and chaff. One of the common deficiencies in this type of cyclone separator which has been developed heretofore however, as well as previously employed methods, resides in the fact that considerable power is required to operate the same effectively due to such separators introducing mixtures of threshing products such as grain, straw and chaff into the top of the separator and, after the grain has been separated by downward movement, from the lighter weight straw and chaff products, said lighter weight or more buoyant products are removed by the use of upwardly directed draft means from the top of the separator. Hence, not only is the straw and chaff removed upwardly from the separator by suction-type draft means which require substantial power to produce, but it is necessary for the straw and chaff to change its direction of movement abruptly, substantially 180°, thereby impeding the flow of the straw and chaff material through the separator.

It is the principal object of the present invention to provide a cyclone separator and method of separation particularly designed, but without restriction thereto, to the separation of grain products from more buoyant threshing products such as straw and chaff, and in which separator a substantially straight through pathway is provided for the product, said pathway extending from the upper to the lower portion of the separator, whereby the force of gravity aids in the passage of material through the separator, and the material is caused to assume a spiral path within the separator while moving downward therethrough to aid in the separation of the heavier grain material from the lighter and more buoyant straw and chaff material incident to the straw and chaff material passing downwardly through said substantially unobstructed path to the exit therefor adjacent the lower portion of the separator.

Another object of the invention is to constrict the path of movement of the material through the separator and particularly that of the straw and chaff material so as gradually to guide the same inwardly as well as downwardly, whereby the centrifugal separation of the heavier grain material therefrom may take place more expeditiously without substantially interfering with the passage of the straw and chaff material through the separator, whereby substantially less power is required to provide draft means to move the material through the separator and cause it to assume a spiral path than is necessary in known separators presently in use.

A further object of the invention is to utilize fluid current such as air which is directed into the separator from draft producing means such as fans or blowers but the conductor means for the fluid currents are so positioned relative to the separator that neither the mixed material prior to separation, nor the separated threshing products are engaged by such draft producing means, whereby the straw is subjected to less breakage than in conventional cyclone separators and thus said straw is capable of being salvaged in useful form if desired and the grain products are not subjected to undesirable beating or pulverizing.

Still another object of the invention is to provide separating means within the chamber of the cyclone separator between the top and bottom thereof, said separating means having openings therethrough to permit the passage of grain therethrough by gravity while the lighter weight or more buoyant straw and chaff material moves past said separating means in a substantially unobstructed manner, and auxiliary fluid currents such as air are directed upwardly through said separating means to facilitate the passage of the more buoyant straw and chaff material past the upper surface thereof and also to produce pressures within the separator greater than atmospheric, thereby enhancing the movement of the straw and chaff material from the lower portion of the separator by reason of said fluid currents within the separator discharging freely to atmosphere and at the exit of the separator for the straw and chaff material. Incident to this object of the invention, the auxiliary fluid current which is directed upwardly through the separating means is not necessarily of high pressure, whereby only slightly additional power is required to produce the same, and said auxiliary current, in moving upwardly in counter direction to the falling grain operates to clean said grain and carry chaff and dust which may have passed through the separating means back through the same to re-entrain it in the straw and chaff moving past the upper surface of the separating means and into a discharge conducting means centrally within the cyclone separator and extending downward from the separating means therein.

A still further object of the invention is to provide one embodiment wherein a plurality of separating means are employed in vertically spaced relationship to each other, whereby the uppermost separating means has coarser openings therein than the lower means to afford a multi-stage separation of the grain from the straw and chaff material, thus producing cleaner grain and less grain in the tailings than if only a single separating means were used.

Still another object of the invention is to provide additional separating means near the exit for the straw and chaff material through which tailings within the discharging straw and chaff may pass to conducting means arranged to re-introduce such tailings into the threshing compartment or inlet conduit for reprocessing within the cyclone separator, thereby insuring a minimum of waste of useful products.

One further object of this invention is to provide separating means within the cyclone separator having a substantially horizontal upper surface in which passage openings for the grain products are provided, said passage openings, in the preferred embodiment of the invention, comprising radial slots having downwardly extending surfaces at the trailing edges of said horizontal surfaces in the direction of the spiralling movement of the material through the cyclone separator, thereby providing an upper surface on the separating means capable to facilitate the passage of the straw and chaff material thereover while moving from the upper portion of the cyclone separator to the conducting means therein for the more buoyant straw and chaff material.

Details of the foregoing objects and of the invention, as well as other objects thereof, are set forth in the following specification and illustrated in the accompanying drawings comprising part thereof.

In the drawings:

FIG. 1 is a side elevation of a cyclone separator shown partly in vertical section and embodying the principles of the present invention.

FIG. 2 is a top plan view of the cyclone separator illustrated in FIG. 1.

FIG. 3 is a fragmentary vertical section of a detail of a preferred type of separating means employed within the cyclone separator as viewed along the line 3—3 of FIG. 2.

FIG. 4 is a side elevation of a further modification of cyclone separator employing the principles of the present invention and illustrated on a smaller scale than that used in FIGS. 1 through 3, part of said separator being broken away to illustrate interior details thereof which are illustrated in vertical section.

The present invention pertains to a cyclone separator capable of producing a novel method of separating heavier material from more buoyant material such as the separation of grain from other threshing products such as straw, chaff, weeds and the like. Several preferred embodiments of the separator are illustrated on the attached drawings, which embodiments of separator are capable of readily performing such novel method of separation. Said method primarily comprises the introduction of a mixture of heavier material such as grain with more buoyant material such as straw and chaff into the upper end of the separator, tangentially, thereby inducing a spiral downward movement of the material through the separator. While spiralling downward through the separator, gravity and centrifugal action operate to cause the heavier material such as grain to pass through separating means over which the mixture of material passes, while the lighter weight or more buoyant material such as straw and chaff readily passes over said separating means without substantial impedance and into a downwardly extending, substantially central conducting means which constricts such straw and chaff in a maner to facilitate the separation of the heavier grain material therefrom by the separating means which is intermediately of the path of movement of the material from the upper to the lower portion of the cyclone separator.

The entire passage of all of the material through the separator generally is spirally downward with no abrupt changes in the path of movement, whereby minimum power is required to produce an adequate fluid stream to both introduce the material to the separator and also carry the same therethrough. As a beneficial adjunct to the invention, from the time the material leaves the threshing compartment, it is not engaged by any means such as blowers, fan blades and the like which are used to produce such fluid streams as is customary in many types of cyclone separators and wherein the impellers of such blowers or fan means not only tend to obstruct the passage of material through the separator but also subject the material to considerable beating, breaking, and pulverizing. None of these detrimental effects are present in applicant's method and the preferred embodiments of cyclone separator construction for performing such method.

Referring to FIGS. 1 and 2, it will be understood that material such as cut grain products are introduced either manually or by power means to the entrance 10 of a threshing compartment 12 within which a threshing cylinder 14 is rotatably supported by conventional means. An air inlet 16 is provided in one end or both ends of the threshing compartment 12. The threshing cylinder 16 is driven by a shaft 18 connected to a suitable source of power such as a power driven combine or other appropriate power means in the event the threshing mechanism is mounted stationarily. The rotating threshing cylinder 14 will induce a substantial intake of air through the openings 16 and the fluid current produced by said air is directed through a conduit 20 to carry the mixed threshed products comprising grain, straw, chaff and the like into an inlet conduit 22 communicating tangentially with the upper end of a separating chamber 24 of the cyclone separator 26.

As best illustrated in FIG. 1, the cyclone separator 26 may be fabricated from a number of sheet metal parts including an annular header 28 which is semi-circular in vertical cross-section as shown in FIG. 1, the lower edge of the outer surface of which is connected to the upper perimeter of the circular separating chamber 24 by any suitable means. It will be seen that the outer walls of the chamber 24 are curved downwardly and inwardly in vertical cross-section and disposed centrally within the chamber 24 is a cup-shaped inner member 30, the upper end of which is adjustable vertically relative to the inner walls of the annular header 28 for purposes to be described. In vertical cross-section, the inner member 30 is generally evenly spaced from the inner surface of the separating chamber 24 as clearly shown in FIG. 1, thereby providing an annular passage 32 which extends downward from the header 28.

Intermediately of the upper and lower portions of the separator 26 is annular separating means 34 which is somewhat shelf-like and in cross-section is curved so as to constitute a continuation of the curved walls of the separating chamber 24, the inner periphery of said separating means 34 being connected to the upper end of a central tubular conducting means 36 which is coaxial with and of smaller diameter than the separating chamber 24. The lower end of the conducting means 36 is curved to one side of the cyclone separator unit and is connected to the upper end of compartment means 38 which receives tailings separated from the straw and chaff which passes downward through the conducting means 36 for discharge through an exit 40. Mounted within the compartment means 38 is a second separating means, preferably of simple form such as a bar grate 43 over the upper surface of which the straw and chaff passes readily, while tailings sift through the bar grate and are collected in the bottom of compartment means 38. A rotatable auger 42 is mounted within the lowermost portion of the compartment means 38, as clearly shown in FIGS. 1 and 2, said auger being rotated by a power-driven shaft 44 for progressive removal of the tailings to the entrance end of a return conduit 45 to the threshing compartment 12 or the inlet conduit 20, as desired.

Surrounding the tubular conducting means 36 and spaced radially outward therefrom is a circular and preferably downward and inwardly tapering shell 46 defining an annular passage 48 extending downwardly to a grain compartment 50 which preferably has a sloping bottom wall 52 leading to a grain auger 54 which is driven by a power shaft 56 connected by suitable means, not shown, to any suitable source of power such as the threshing cylinder, combine, or other available power means, for rotation of said auger at a desired rate of speed. Conduit means 57 communicate with one end of the lower portion of the grain compartment 50, as shown in FIG. 2, for purposes of conducting the collected grain to suitable storage means or the like of a movable or stationary type. The means forming the compartment 50 are connected at the upper end thereof by any suitable means to the lower end of the shell 46, whereby the compartment 50 is closed and is completely separated from the tubular conducting means 36 through which the straw and chaff passes downwardly through and from the exit 40 of the cyclone separator 26.

Mounted preferably adjacent one side of the means forming the compartment 50 is a fan housing 58 within which a suitable fan 60 is rotatably mounted, the same being driven by a suitable power shaft 62. One end of the housing 58 is shown having an air inlet opening 64. If preferred, both ends of the housing may have inlet openings. The power shaft 62 is connected to any suitable source of power to rotate the fan at a desired speed to produce an auxiliary fluid current of preferably lower volume than the volume of the fluid current which is directed downwardly through the annular passage 32. The fluid current produced by the fan 60 is directed upwardly through the annular passage 48, in the direction of the arrows 66, said upward current being counter to and intersecting the falling grain which passes through the separating means 34 into the compartment 50. Such upwardly directed current 66 cleans the falling grain and carries the lighter material such as chaff, dirt, dust and the like upwardly through the separating means 34 so as to recombine the same with the straw and chaff which is passing over the upper surfaces of the separating means 34, as indicated by the arrows 68.

The upwardly moving fluid stream 66 has an important additional and beneficial function comprising aiding in the passage of the stream of straw and chaff, as indicated by the arrows 68, over and past the upper surface of the separating means 34. Further, the addition of the auxiliary fluid current 66 which arises through the compartment 48 increases the internal pressure of the fluid stream within the separating chamber 24 and tubular conducting means 36, thereby insuring positive passage of the straw and chaff downward through the conducting means 36, said pressure being in excess of atmospheric and said fluid stream moving in the same general direction as the arrows 68 to carry the straw and chaff which is induced to move thereby downwardly through the conducting means 36 by said fluid stream for discharge through the exit 40.

It will be observed particularly from FIG. 1 that after the material leaves the threshing cylinder 14, which it must necessarily engage in order to thresh the grain from the heads on the straw or the like, neither the grain nor the straw and other threshing products are engaged by any moving members or impeller means such as are employed in a fan or blower for purposes of directing either the primary fluid stream or producing the auxiliary fluid stream described above. It is obvious that neither the grain nor the straw or chaff is engaged by the fan 60 which produces the auxiliary, upwardly directed fluid stream 66. Hence, the desired useful grain products thus are subjected only to beating in the threshing chamber 12 and, after passing from the threshing chamber, the threshing products including both the grain and more buoyant material such as straw and chaff pass quickly and freely along a substantially unobstructed path without engagement by any moving elements while spiralling downward through the annular passage 32, past the separating means 34 through which the grain passes by reason of gravity and centrifugal force for separation from the straw, chaff, and other by-products, said straw and chaff then being constricted for passage into the conducting means 36 for final discharge through the exit 40. Such constricting of the straw and chaff products facilitates the separation of the grain therefrom by gravity and centrifugal action so that said grain may pass through the separating means 34 and into grain compartment 50.

One preferred form of separating means 34 is illustrated in cross-section in FIG. 3, as seen upon the line 3—3 of FIG. 2. In such preferred construction, the separating means 34 is formed from sheet metal or the like and mounted so as to have a substantially horizontal surface member 70, which surface is interrupted by radial slots 72 comprising opening means defined by angularly extending surface members 74 which extend downward from the trailing ends of the horizontal surface members 70 in the direction of spiralling movement of the straw and chaff products, for example, moving over the horizontal upper surfaces 70 for passage to the tubular conducting means 36. While this is a preferred form of separating means as illustrated in FIG. 3, it is to be understood that the invention is not to be restricted to the use of such specific means however. Nevertheless, said means is highly effective to permit the ready passage of grain material through the radial slots 72, whereupon the grain falls by gravity into the compartment 50 and incidentally is cleaned by means of the upwardly directed fluid currents 66 rising through the annular passage 48 within shell 46.

A further embodiment of the present invention is illustrated in FIG. 4 wherein a circular chamber 76 is positioned at the upper end of a downwardly and inwardly tapering compartment 78, the chamber 76 and compartment 78 functioning similarly to the separating chamber 24 and shell 46 in the embodiment shown in FIGS. 1 through 3. An inlet conduit 80 communicates tangentially with one side of the cylindrical chamber 76 for the introduction of mixed grain and more buoyant products such as straw and chaff, by means of a fluid current, into the separating chamber 76. The upper end of the chamber 76 is covered by a top 82. Depending centrally from said top 82 and supported thereby is a preferably cylindrical extension 84 which is mounted for vertical adjustment upon a central supporting member 86 which is fixed at its upper end to the top 82. Desired vertical adjustment of the cylindrical extension 84 is maintained by any suitable means such as a locking bolt 89. Surrounding the cylindrical extension 84 is a rib 88 which spirals therearound downwardly in the direction of spiralling movement of the threshing product material introduced into the separating chamber 76 through the inlet conduit 80.

Extending radially inward from the separating chamber 78 is the upper of a pair of annular separating means 90 and 92. The perimeter of the upper separating means 90 engages the interior of separating chamber 76 and/or tapering compartment 78 while the perimeter of the lower separating means 92 engages the interior of tapering compartment 78 as shown in FIG. 4. The upper separating means 90 is provided with a central opening 94 which is smaller in diameter than the central opening 96 of the lower separating means 92. Although not illustrated in detail, it will be understood that the separating means 90 and 92 have radial slots therethrough similar to the slots 72 of the separating means 34 in the embodiment illustrated in FIGS. 1 through 3, or any other suitable openings through which grain readily may pass. Preferably however, the opening means, whether slots or otherwise, formed in the upper separating means 90 are larger than those in the lower separating means 92, wherein a multi-stage, successively finer separating means is provided in this embodiment of the invention.

By reason of the central opening 94 in the upper separating means 90 being smaller than the central opening 96 in the lower separating means 92, when straw and chaff passes over the upper separating means 90 for separation of the grain therefrom and passes through the central opening 94, there is no danger of said straw and chaff passing onto the lower separating means 92. The upper end of a tubular conducting means 98 is connected to the perimeter of the central opening 96 of the lower separating means 92, whereby any straw or chaff which passes through the upper separating means 90 onto the lower separating means 92 then may pass over the upper surface of the said lower separating means readily into the conducting means 98 for passage to exit from the cyclone separator shown in this embodiment of the invention.

It will be seen that the cyclindrical extension 84 shown in FIG. 4 is substantially coaxial with the central openings 94 and 96 of the separating means 90 and 92, as well as with the tubular conducting means 98. Inasmuch as the cylindrical extension 84 is vertically adjustable particularly relative to the central opening 94, suitable adjustment of the extension 84 relative to the central opening 94 in the upper separating means 90 will result in desired variations in control of the flow of the straw and chaff materials through the opening 94 and downward into the conducting means 98, the result being somewhat similar to a metering action, whereby the flow of such straw and chaff material through the cyclone separator may be regulated to a desired rate to insure adequate separation of grain material therefrom.

It also is to be understood that spiral rib means similar to spiral rib 88 may be added to the inner surface of member 30 of the embodiment shown in FIGS. 1 through 3 so as to project radially into annular passage 32 and such inner member 30 likewise is vertically adjustable by any suitable means such as the exemplary transverse supporting brace 100 which is fixed at its opposite ends to the header 28 for support thereby. A transverse brace 102 extends across the upper end of the inner member 30 and an adjustable supporting bolt 104 extends between the braces 100 and 102 for vertical adjustability of the member 30 relative to the header 28, whereby the lower end 106 of the cup-shaped inner member 30 may be moved to variable positions above the upper end of the tubular conducting means 36, thereby affording means to vary the cross-sectional area of passage 32 and thereby control the flow of straw and chaff material past the separating means 34 and into the tubular conducting means 36 for discharge from the cyclone separator.

While the invention has been described and illustrated in its several preferred embodiments, and has included certain details, it should be understood that the invention is not to be limited to the precise details herein illustrated and described since the same may be carried out in other ways falling within the scope of the invention as claimed.

I claim:

1. A method of separating grain from the other more buoyant products of threshing such a straw, chaff and the like, comprising subjecting a mixture of grain and other threshing products to a fluid current spiralling along a substantially unobstructed downwardly and inwardly extending path, constricting said more buoyant products during such downward movement while separating the grain therefrom by gravity and the centrifugal force of said spiralling current during continuous substantially downward movement of said more buoyant products to discharge continuously and positively directing a secondary fluid current counter to said falling grain to clean said grain and aid movement of said buoyant products during the constricting movement thereof, and collecting the separated and cleaned grain.

2. A method of separating grain from the other more buoyant products of threshing such as straw, chaff and the like, comprising subjecting a mixture of grain and other threshing products to a fluid current spiralling downward along a substantially unobstructed path, directing said more buoyant products toward the center of said current during such downward movement to effect separation of the grain therefrom by the centrifugal force of said spiralling current during movement of said more buoyant products downwardly to discharge at the lower end of said downward path, permitting said grain to fall by gravity when separated from said more buoyant products, subjecting said falling grain to a secondary fluid current directed continuously and positively counter to said falling grain to clean said grain, merging said secondary fluid current with said spiralling current to produce a resultant current operable to enhance the movement of said more buoyant products both toward the center of said spiralling current and downward to discharge, and collecting the separated grain.

3. A cyclone-type separator for mixtures of heavier grain products and more buoyant threshing products such as straw and chaff comprising a separating chamber, an inlet conduit communicating substantially tangentially with the upper portion of said chamber to feed a mixture of such products to said chamber, said chamber having guide means providing a substantially unobstructed downward path for said products while spiralling downward within and through said chamber, stationary means positioned within said chamber intermediately of the ends of the path of movement of said products and arranged to be traversed by said moving products, said stationary means being operable to accept the heavier grain products separated by gravity and centrifugal force from the more buoyant threshing products while the same are spiralling downward and remove such heavier products from said chamber and said stationary means being continuous with guide means of said chamber to provide continuous and smooth guide means for said more buoyant products, conducting means substantially continuous with and extending downward from said stationary means to receive said more buoyant threshing products separated from said grain and discharge same downwardly from the lower portion of said chamber, and means operable to produce a fluid current and direct it into said inlet conduit for substantially unobstructed downward spiralling movement through said chamber and conducting means.

4. A cyclone-type separator for mixtures of threshing products comprising heavier grain material and more buoyant threshing product material such as straw and chaff, said separator comprising in combination, a separating chamber substantially circular in cross section and having a substantially vertical axis, an inlet conduit communicating substantially tangentially with the upper portion of said chamber to feed a mixture of such material to said chamber, said chamber having downwardly and inwardly curved guide means providing a substantially unobstructed downward path for said material while spiralling downward within and through said chamber, stationary separating means extending into said chamber to intercept the movement of said mixture and having substantially radial apertures operable to permit the heavier material to pass therethrough for separation from the more buoyant material and removal from said chamber during the spiralling downward movement of the material and, said separating means being shaped to enhance the passage of the more buoyant material past said separating means and the latter being smoothly continuous with the curved guide means of said chamber, conducting means adjoining and extending downward from said separating means to receive said more buoyant separated threshing material and discharge the same from the lower portion of said chamber, and means operable to produce a fluid current and direct it into said inlet conduit for substantially unobstructed downward spiralling movement through said chamber and conducting means for discharge from said separator.

5. The separator set forth in claim 4 further characterized by said stationary separating means being substantially annular and curved generally in continuation from said guide means to bridge an annular discharge space surrounding said discharge conducting means.

6. The separator set forth in claim 4 further including means operable to produce an auxiliary fluid current and direct the same upwardly through the apertures of said separating means to effect a merger with the current downwardly spiralling through said chamber and thereby facilitate the passage of the more buoyant threshing products past said separating means and into said conducting means.

7. A cyclone-type separator for mixtures of threshing products comprising heavier grain material and more buoyant threshing product material such as straw and chaff, said separator comprising a separating chamber circular in cross-section, an inlet conduit communicating substantially tangentially with the upper portion of said chamber to feed a mixture of such material to said chamber, the interior of said chamber being shaped to provide guide means defining a substantially unobstructed downward path for the material while spiralling downwardly within and through said chamber, stationary separating means extending around the interior of said chamber and projecting into said chamber to intercept the path of movement of said material, said separating means engaging the inner surface of said chamber and having apertures extending substantially radially and operable to permit the heavier material to pass therethrough for separation from the more buoyant material and removal of said heavier material from said chamber during the downwardly spiralling movement of the material past said separating means, conducting means positioned substantially coaxially within the lower portion of said chamber and extending downward from said separating means and operable to receive said more buoyant separated material and discharge the same downwardly from said separating means and the lower portion of said chamber, and means operable to produce a fluid current and direct it into said inlet conduit for substantially unobstructed downward spiral movement through said chamber and conducting means to effect discharge of said more buoyant material from said separator.

8. The separator set forth in claim 7 further characterized by said substantially radially apertured separating means being shelf-like and extending substantially radially inward a limited distance from the inner surface of said chamber and the inner periphery of said separating means being substantially coincident with the upper end of said conducting means, said separating means being shaped smoothly continuous with the inner surface of said chamber which it adjoins.

9. The separator set forth in claim 7 further including additional separator means positioned to be traversed by the more buoyant material after it has transversed said first mentioned separating means to separate the heavier material therefrom and operable to permit separation of tailing material from the more buoyant material prior to it being discharged from said conducting means.

10. The separator set forth in claim 8 further including means surrounding said conducting means and communicating with the underside of said separating means, and means operable to produce an auxiliary fluid current rising within said surrounding means to aid in urging the more buoyant material past the upper surface of said separating means for movement into said conducting means.

11. A cyclone-type separator for mixtures of threshing products comprising heavier grain material and more buoyant threshing product material such as straw and chaff, said separator comprising an annular chamber having an inner surface extending downward and curving inward smoothly to form a constricting passage extending downward, an inlet conduit communicating substantially tangentially with the upper portion of said chamber to feed a mixture of such threshing products tangentially to the upper portion of said chamber, the interior wall surfaces of said chamber being shaped to provide guide means defining a substantially unobstructed downward path for said material while moving downward and spiralling within and through said chamber, annular stationary separating means extending around the interior of said chamber below the top and adjoining the sides thereof to form a smoothly curved continuation of the interior wall surface of said chamber and arranged to be traversed by said material, said separating means having substantially radially extending openings of sufficient size to permit passage of the heavier grain material therethrough for separation from the more buoyant material while spiralling downward through said chamber, conducting means of smaller diameter than the interior walls of said chamber and coaxial therewith, said conducting means adjoining and extending downward from said separating means to receive said more buoyant material and discharge the same from the lower portion of said chamber, and means operable to produce a fluid current and direct it into said inlet conduit for downward spiralling movement through said chamber and conducting means to carry said threshing product material downwardly and spirally through said chamber and conducting means to effect separation of the heavier grain material from the more buoyant material by centrifugal force and gravity while constricting said more buoyant material incident to such separation to aid in separation of the heavier grain material therefrom without appreciably impeding the substantially straight through downward passage of both the heavier and more buoyant threshing products through said separator and discharge thereof from the lower end of said separator.

12. The separator set forth in claim 11 further characterized by said separating means extending substantially radially inward from the outer walls of said chamber and having a substantially horizontal upper surface provided with substantially radial slots therein defined by angular surfaces extending downward from said horizontal upper surface at the trailing edges of said upper surface adjacent said slots in the direction of spiralling of the more buoyant material past said horizontal surface.

13. A cyclone-type separator for mixtures of threshing products comprising heavier grain material and more buoyant threshing product material such as straw and chaff, said separator comprising a separating chamber, an inlet conduit communicating substantially tangentially with the upper portion of said chamber to feed a mixture of such material to said chamber, guide means within said chamber providing a substantially unobstructed downward path for said material while spiralling downward within said chamber, a plurality of stationary separating means within said chamber having substantially central openings and mounted below the top of and extending inward from the outer walls of said chamber, said separating means being spaced vertically relative to each other within said chamber and between the upper and lower ends thereof and operable to receive therethrough successively the heavier grain material and separate it from the more buoyant material while said material is spiralling downward, conducting means extending downward from the central opening of the lowest of said separating means to receive said more buoyant material and discharge the same from the lower portion of said chamber, and means operable to produce a fluid current and direct it into said inlet conduit for substantially unobstructed downward spiralling movement through said chamber and conducting means for discharge from said separator.

14. The separator set forth in claim 13 further characterized by the central opening in said upper separating means being larger in diameter than that in the lower of said separating means, and said separating means having passage openings therein to permit grain to sift therethrough, the passage openings in the upper separating means being larger than those in the lower separating means.

References Cited in the file of this patent

UNITED STATES PATENTS

| | | |
|---|---|---|
| 940,827 | Sheward | Nov. 23, 1909 |
| 2,638,181 | Gordon | May 12, 1953 |
| 2,829,771 | Dahlstrom | Apr. 8, 1958 |
| 2,890,764 | Arnold | June 16, 1959 |